May 22, 1934.   E. STICH   1,959,554
APPARATUS FOR AERATING FERMENTING LIQUIDS
Filed Feb. 7, 1931
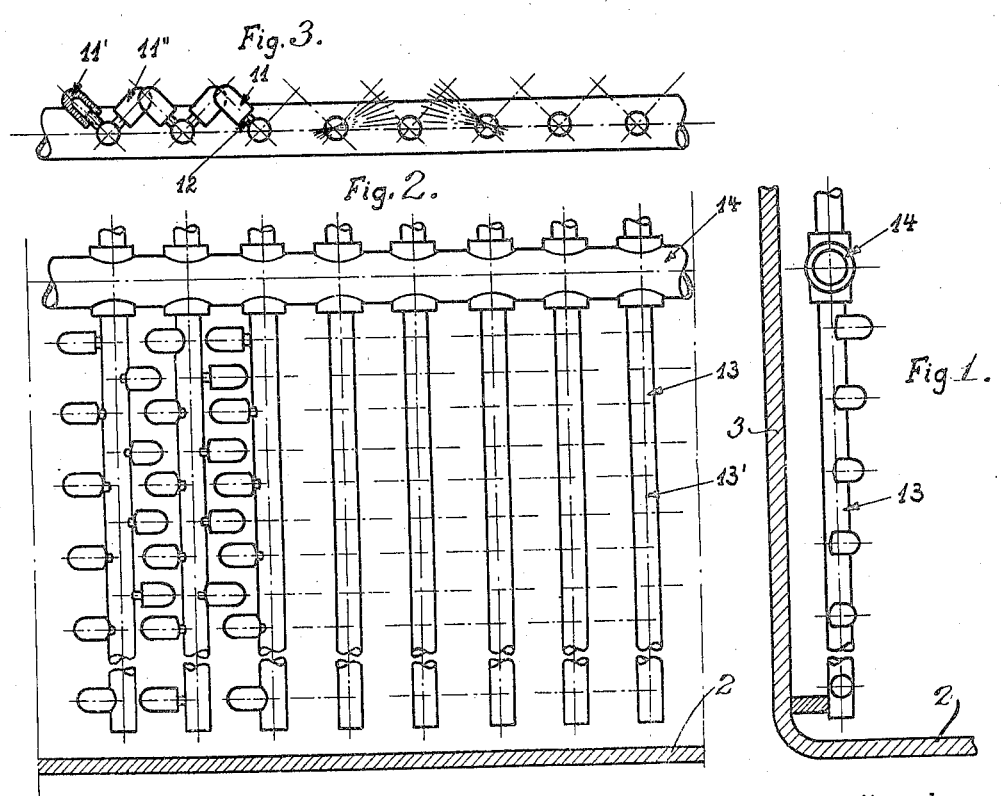
Inventor
Eugen Stich
by
Attorney Patented May 22, 1934

1,959,554

UNITED STATES PATENT OFFICE 1,959,554

APPARATUS FOR AERATING FERMENTING LIQUIDS

Eugen Stich, Mannheim, Germany

Application February 7, 1931, Serial No. 514,211
In Germany December 13, 1929

2 Claims. (Cl. 261—124)

This invention relates to a new and useful apparatus for aerating fermenting liquids for the purpose of producing yeast.

It is the main object of the invention, to provide the yeast cells with sufficient oxygen for promoting their growth in the most favourable way. In order to secure this effect, the air containing the oxygen must be subdivided into bubbles having very small diameters. To obtain such bubbles thick walled hollow aerating bodies are provided for having pores of about $25\mu$ or less; by these latter means, the pressure for causing the air to pass through the hollow aerating bodies is made sufficiently slow and the bodies are made sufficiently strong for protecting them from becoming mutilated under the normal working condition. Due to the invention, the best effect is obtained in biological and technical view.

The invention consists in the steps, arrangements and combinations of means as described in the following statement with reference to the accompanying drawing:

In the drawing

Fig. 1 is a diagrammatic vertical section of a fermenting vat having an aerating device according to the invention;

Fig. 2 is a plan view of the same apparatus and

Fig. 3 is a side view of the aerating bodies showing different positions within the liquid.

In the fermenting vat 2 (Figs. 1 and 2) the aerating device is provided at some distance above the bottom 3 of said vat.

11 designates thick walled hollow or tube like porous bodies, the pores being about $25\mu$ ($25\mu$ is equal to 1/40 millimeters). The material for these bodies may be ceramic material. In lieu of it another material having the same fineness of pores may be employed It has already been proposed to employ a porous material having pores of a fineness between $0{,}25$ and $0{,}40\mu$; but the manufacture of such material presents considerable difficulties. These difficulties are avoided according to the present invention by employing diameters of pores onto $25\mu$ and thicker walls, it being further necessary that the cross section of the fermenting liquid above the aerating device shall be smaller than the surface of the aerating device in contact with the fermenting liquid.

The air is introduced into the liquid by means of a main tube 14, being provided with branch tubes 13, from which the air is guided into the hollow bodies 11, closed at one end and open at their other end to be brought into connection with the branch tubes, the air streaming into the bodies 11 and passing through their porous walls, being divided to extremely fine bubbles which bubbles do not reunite in the liquid. Also with the greater diameter of the pores the bubbles of air do not unite after being discharged of the pores.

This fact is, according to the inventor's opinion, caused by electric processes, the bubbles of air, owing to the friction of the air in passing through the fine pores of the plates, being charged by electric loads of same sign, and in consequence repelling each other in the liquid medium. Thereby it is possible to offer to each cell of yeast present in the liquid a small bubble of air containing oxygen.

The branch pipes 13 are provided with nipples 12, upon which the aerating bodies 11 are fastened. These bodies 11 are arranged at different angles of inclination towards the horizontal and are further of graduated lengths. Thereby streams or eddies are produced in the aerated liquid, the liquid pressure upon the different bodies being different according to their angular position, e. g. the body 11' being at an angle of 45° will discharge more air than the like body 11'' being at an angle of about 43° only.

In lieu of ceramic material other materials such as porous metals, porous rubber or porous glass may be employed. Textile and fibrous material, especially porous rubber fabric or fibrous rubber material may also be employed, the elastic dilation of the rubber fibres producing a like effect as the fine pores of the diaphragm material.

What I claim is:

1. Apparatus for aerating fermenting liquids comprising in combination a vessel for the liquid, guiding tubes for a gaseous fluid in said vessel at least partially submerged in the liquid, for delivering a gas beneath the surface of the liquid, thick-walled, hollow, porous bodies with pores of about $25\mu$ or less covering the open ends of said tubes and being in gas tight connection therewith, the other end of said bodies being closed, and the total surface of said bodies in contact with the liquid being greater than the cross sectional area of said vessel.

2. Apparatus for aerating fermenting liquids comprising in combination a vessel for the liquid, metallic guiding tubes for a gaseous fluid in said vessel submerged in the liquid for delivering the gas beneath the surface of the liquid, tube-like, thick-walled porous bodies with pores of about $25\mu$ or less covering the open ends of the said tubes, nipples at one end of the guiding tubes and of the tube-like bodies to be brought in gas tight connection with the guiding tubes, the other end of the said tube like bodies being closed, and the total surface of the latter in contact with the liquid being greater than the cross-section area of the vessel.

EUGEN STICH.